US012652493B2

(12) United States Patent
Eklund et al.

(10) Patent No.: US 12,652,493 B2
(45) Date of Patent: Jun. 9, 2026

(54) INTEGRATED CIRCUIT ARRANGEMENT SUPPORTING AGGREGATED TRANSDUCERS

(71) Applicant: Cirrus Logic International Semiconductor Ltd., Edinburgh (GB)

(72) Inventors: Jonathan E. Eklund, Austin, TX (US); Daniel Weber, Austin, TX (US); Andrew I. Bothwell, Edinburgh (GB); Robert J. Hatfield, Edinburgh (GB)

(73) Assignee: Cirrus Logic Inc., Austin, TX (US)

( * ) Notice: Subject to any disclaimer, the term of this patent is extended or adjusted under 35 U.S.C. 154(b) by 431 days.

(21) Appl. No.: 18/210,790

(22) Filed: Jun. 16, 2023

(65) Prior Publication Data

US 2024/0040316 A1 Feb. 1, 2024

Related U.S. Application Data

(60) Provisional application No. 63/393,343, filed on Jul. 29, 2022.

(30) Foreign Application Priority Data

Feb. 3, 2023 (GB) ..................................... 2301581

(51) Int. Cl.
*H04R 5/04* (2006.01)
*H04R 3/04* (2006.01)

(52) U.S. Cl.
CPC ................. *H04R 5/04* (2013.01); *H04R 3/04* (2013.01)

(58) Field of Classification Search
CPC .... H04R 5/04; H04R 3/04; H04R 3/14; G06F 3/162; G06F 3/16; H04B 3/20
See application file for complete search history.

(56) References Cited

U.S. PATENT DOCUMENTS

| | | | | |
|---|---|---|---|---|
| 2012/0155670 | A1 | 6/2012 | Rutschman | |
| 2017/0229138 | A1* | 8/2017 | Kotera | H04R 3/02 |
| 2018/0098150 | A1 | 4/2018 | Penke et al. | |
| 2018/0227414 | A1* | 8/2018 | Kim | H04M 3/002 |
| 2019/0052961 | A1 | 2/2019 | Yun et al. | |
| 2019/0174557 | A1 | 6/2019 | Ueda et al. | |
| 2020/0034109 | A1* | 1/2020 | Price | G06F 3/162 |
| 2025/0071483 | A1 | 2/2025 | Eklund et al. | |

FOREIGN PATENT DOCUMENTS

WO 2008113053 A1 9/2008

OTHER PUBLICATIONS

Combined Search and Examination Report under Sections 17 and 18(3), UKIPO, Application No. GB2301581.1, mailed Jul. 19, 2023.

Combined Search Report under Section 17(5)(b) and Abbreviated Examination Report under Section 18(3), UKIPO, Application No. GB2318978.0, mailed Jan. 22, 2024.

Combined Search and Examination Report under Sections 17 and 18(3), UKIPO, Application No. GB2505699.5, mailed May 21, 2025.

Combined Search and Examination Report under Sections 17 and 18(3), UKIPO, Application No. GB2318978.0, mailed Jun. 21, 2024.

* cited by examiner

*Primary Examiner* — Xu Mei
(74) *Attorney, Agent, or Firm* — Jackson Walker L.L.P.

(57) ABSTRACT

In an example there is provided a first integrated circuit. The first integrated circuit is configured to receive an audio signal and configured to drive an audio transducer based on the received audio signal. The first integrated circuit is configured to transmit a portion of the audio signal to a second integrated circuit.

29 Claims, 10 Drawing Sheets

INTEGRATED CIRCUIT ARRANGEMENT SUPPORTING AGGREGATED TRANSDUCERS

The present disclosure claims priority to U.S. Provisional Patent Application Ser. No. 63/393,343, filed Jul. 29, 2022, each of which is incorporated by reference herein in its entirety.

TECHNICAL FIELD

Examples described herein relate to integrated circuits (ICs), for example an integrated circuit (IC) supporting a coupling with one or more other ICs such that the two or more coupled ICs appear as a single integrated device to a host processor device and its associated operating system.

BACKGROUND

Depending on the example, a number of transducers may be controlled by a processor (such as a software driver of a processor, or host, running an operating system). Multiple transducers that are connected and that are to be controlled by a driver of a processor may be referred to as "aggregated" transducers, and there can be associated difficulties in controlling such "aggregated" transducers.

These difficulties can include the scenario wherein one particular software driver or controlling software may only work when the "aggregated" transducers or controlling integrated circuits are identical. For example, one particular driver may only output a type or format of signal that is compatible with one transducer of the "aggregated" transducers and that is not compatible with the one or more other "aggregated" transducers, and the input/output signals required by both the driver and the one or more other "aggregated" transducers may not be compatible.

The present examples are concerned with ICs that can present themselves, and their respective transducer(s) to which they are connected, to an operating system and its associated host processor device as a single integrated device. By "integrated" in the sense of "a single integrated device", it is meant that two or more ICs can present themselves as if they were a single IC to software running on a host processor, according to the techniques presented in this disclosure. In other words, the host processor appears, from its perspective, to be coupled to a monolithic integrated device, or monolithic IC, that is made up of a plurality of IC's.

STATEMENTS OF INVENTION

According to an example there is provided a first integrated circuit configured to receive an audio signal and configured to drive an audio transducer based on the received audio signal, the first integrated circuit being configured to transmit a portion of the audio signal to a second integrated circuit.

The first integrated circuit may further comprise a first interface and a processor. The first interface may be configured to receive the audio signal and transmit the audio signal to the processor. The processor may be configured to transmit the portion of the audio signal to the second integrated circuit.

The first integrated circuit may be configured to transmit an echo cancellation signal to an external processor.

The processor may be configured to receive an echo cancellation signal from the second integrated circuit. The first interface may be configured to transmit the echo cancellation to the external processor signal based on the received echo cancellation signal.

The processor may be configured to receive two mono echo cancellation signals and combine these into a stereo echo cancellation signal. The first interface may be configured to transmit the stereo echo cancellation signal to the processor.

The processor may be configured to generate the echo cancellation signal.

The first integrated circuit may be configured to drive at least one tweeter speaker and/or at least one woofer speaker.

The processor may be configured to split the received audio signal into first and second frequency bands. The first integrated circuit may be configured to drive the audio transducer on the basis of one of the first and second frequency bands. The processor may be configured to transmit the other of the first and second frequency bands to the second integrated circuit.

The first integrated circuit may further comprise a second interface. The first integrated circuit may be configured to transmit a control signal, via the second interface, to the second integrated circuit to control a function of the second integrated circuit.

The first integrated circuit may be configured to receive the control signal from an external processor.

The first integrated circuit may be configured to load and/or manage and/or validate firmware on the second integrated circuit via second interface.

The first integrated circuit may be configured such that an external processor can load and/or manage and/or validate firmware on the second integrated circuit via the second interface of the first integrated circuit.

The first integrated circuit may be additionally configured to control an audio jack and/or a microphone.

The first integrated circuit may comprise any one or more of:

- a digital signal processor configured to process the received audio signal;
- an analogue to digital converter configured to receive an input analogue signal and convert it to a digital signal;
- a digital to analogue converter configured to convert a digital signal into an analogue signal to be output to the audio transducer; and
- a microcontroller to process a control message and/or an enhancement and/or a protection algorithm for the first integrated circuit and/or the second integrated circuit.

According to another example there is provided an arrangement comprising:

- a first integrated circuit comprising a first interface to receive an audio signal, and a processor configured to drive a first audio transducer on the basis of the received audio signal; and
- second integrated circuit comprising a processor configured to receive an audio signal;

wherein the processor of the first integrated circuit is configured to transmit a portion of the received audio signal to the processor of the second integrated circuit.

The processor of the second integrated circuit may be configured to drive a second audio transducer on the basis of the signal received from the processor of the first integrated circuit.

One of the first and second integrated circuits may be configured to drive at least one tweeter speaker and wherein the other of the first and second integrated circuits is configured to drive at least one woofer speaker.

The processor of the first integrated circuit may be configured to separate the received audio signal into a first component having a first frequency and a second component having a second frequency. The first integrated circuit may be configured to drive the first audio transducer on the basis of the first frequency signal component. The processor of the first integrated circuit may be configured to transmit the second frequency component to the processor of the second integrated circuit. The processor of the second integrated circuit may be configured to drive the second audio transducer on the basis of the second frequency signal component.

The processor of the second integrated circuit may be configured to transmit an echo cancellation signal to the processor of the first integrated circuit. The first interface of the first integrated circuit may be configured to transmit the echo cancellation signal to an external processor.

The first integrated circuit may comprise a control interface. The second integrated circuit may comprise a control interface. Wherein:

- the first integrated circuit is configured to receive a control signal from an external processor; and/or
- the first integrated circuit is configured to load and/or manage and/or validate firmware on the second integrated circuit via the control interfaces; and/or
- the first integrated circuit is configured such that an external processor can load and/or manage and/or validate firmware on the second integrated circuit via the control interface of the first integrated circuit.

The arrangement may comprise a third integrated circuit comprising a processor configured to receive the audio signal from the first integrated circuit and configured to drive a third audio transducer on the basis of the signal received from the processor of the first integrated circuit.

The first integrated circuit may be configured to drive a pair of tweeters. Each of the second and third integrated circuits may be configured to drive a woofer.

The processor of the second integrated circuit may be configured to transmit a mono echo cancellation signal to the processor of the first integrated circuit. The processor of the third integrated circuit may be configured to transmit a mono echo cancellation signal to the processor of the first integrated circuit. The processor of the first interface may be configured to receive the two mono signals from the second and third integrated circuits, combine the received mono signals into a stereo echo cancellation signal, and the first integrated circuit may be configured to transmit the stereo echo cancellation signal to an external processor.

The first integrated circuit may comprise a control interface. The second and third integrated circuits may respectively comprise a control interfaces. Wherein:

- the first integrated circuit is configured to receive a control signal from an external processor; and/or
- the first integrated circuit is configured to load and/or manage and/or validate firmware on the second and/or third integrated circuits via their control interfaces; and/or
- the first integrated circuit is configured such that an external processor can load and/or manage and/or validate firmware on the second and/or third integrated circuits via the control interface of the first integrated circuit.

The processor of the first integrated circuit may be configured to generate and transmit an echo cancellation signal to an external processor.

The arrangement may comprise a third integrated circuit comprising a processor configured to receive an audio signal and configured to drive a third audio transducer on the basis of the signal received from the processor of the first integrated circuit.

Each of the first and third integrated circuits may be configured to drive a woofer. The second integrated circuit may be configured to drive a pair of tweeters.

According to another example there is provided a system comprising the first integrated circuit or the arrangement as described above, further comprising a processor, wherein the processor stores a programmable table that is readable by software, wherein the table comprises an entry that, when read by an operating system, presents at least the first and second integrated circuits as an integrated device to the operating system.

Any one or more of the first, second, or third integrated circuits may comprise an audio codec and/or a digital signal processor.

At least the first integrated circuit and the second integrated circuit may appear as an integrated solution to a processor running an operating system.

INTRODUCTION OF THE FIGURES

The present disclosure may be understood with reference to the accompanying drawings in which:

FIG. 1*a* is a simplified schematic diagram of an example integrated circuit in association with another device;

FIG. 1*b* is a simplified schematic diagram of example integrated circuits in association with another device;

Figure 5A:
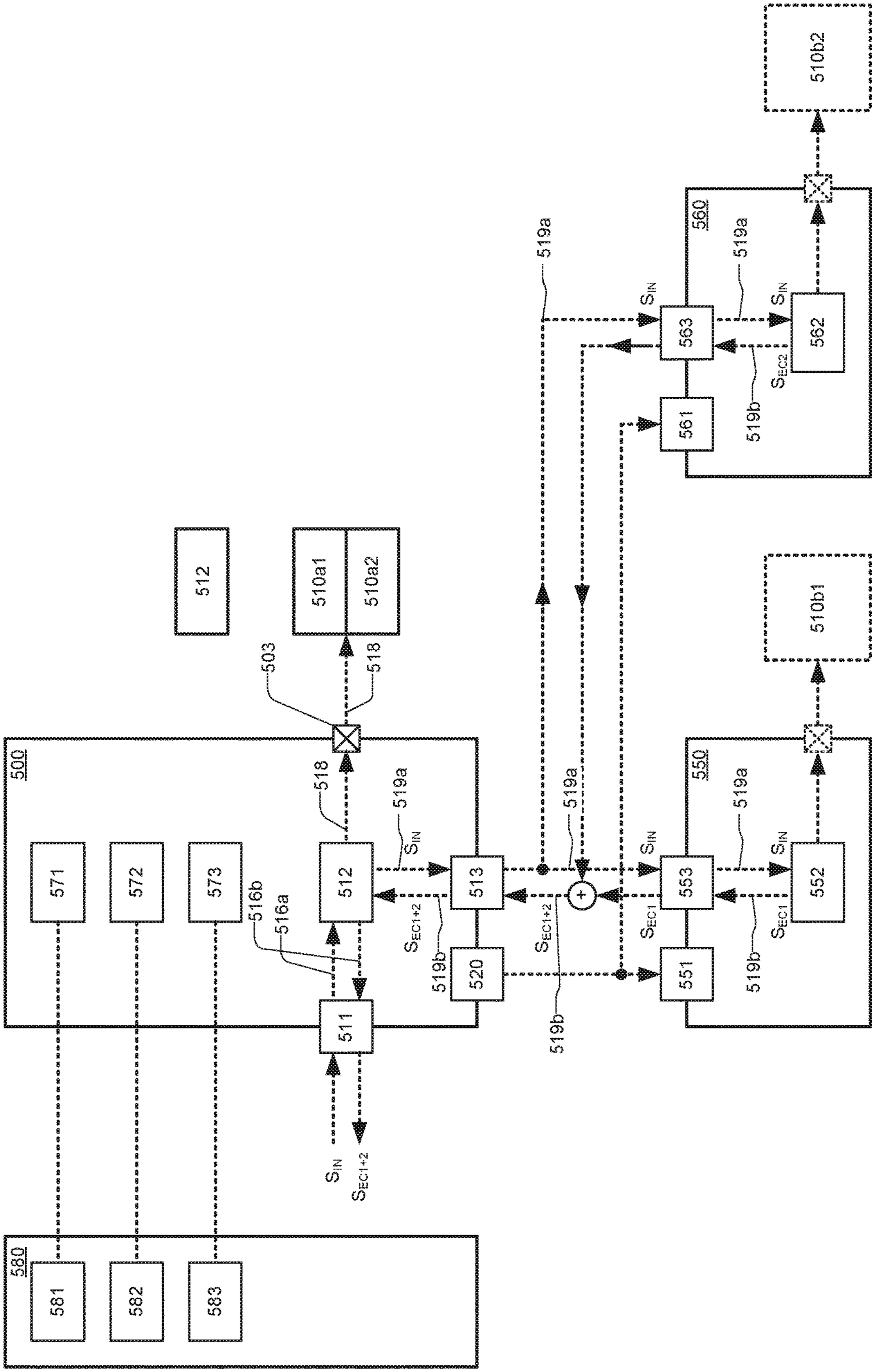
Figure 5B:
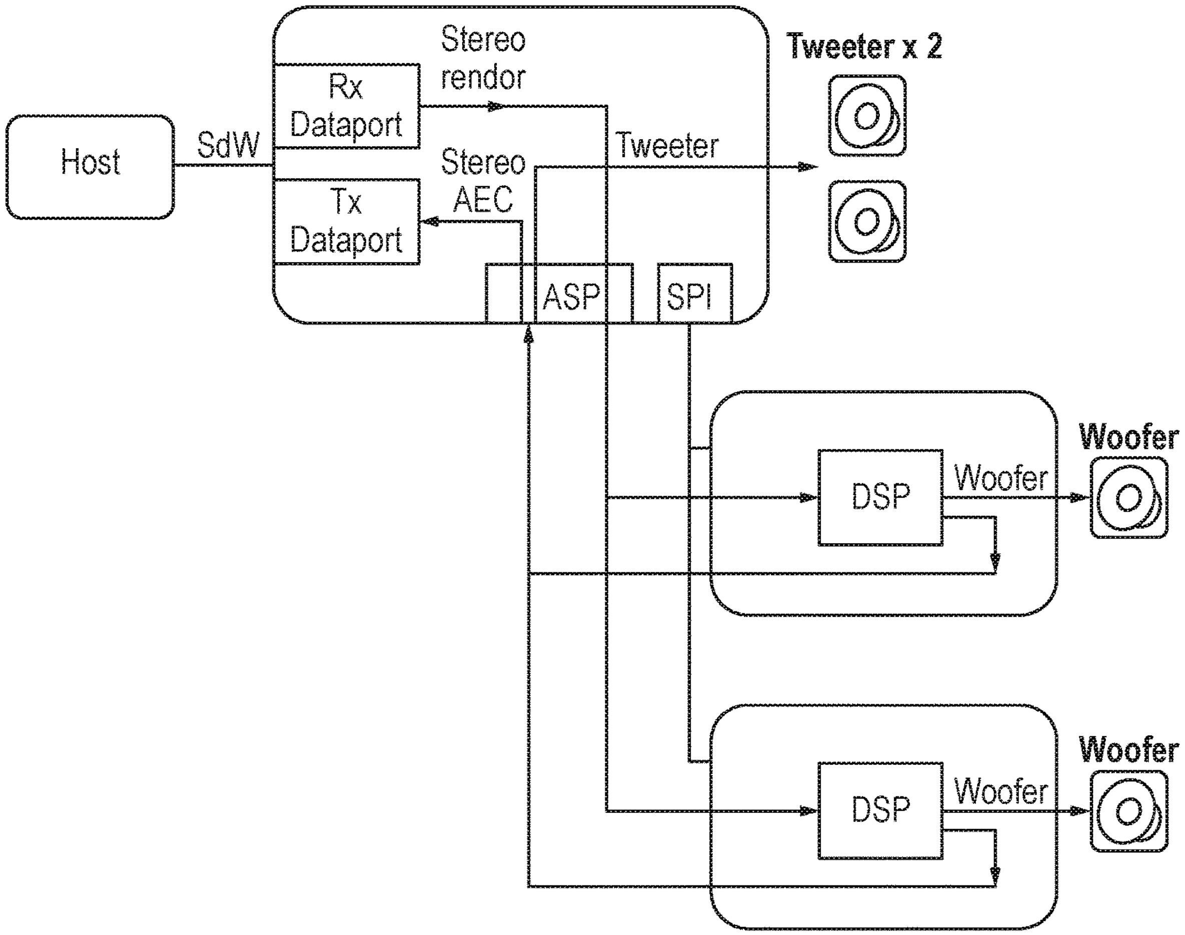
Figure 6:
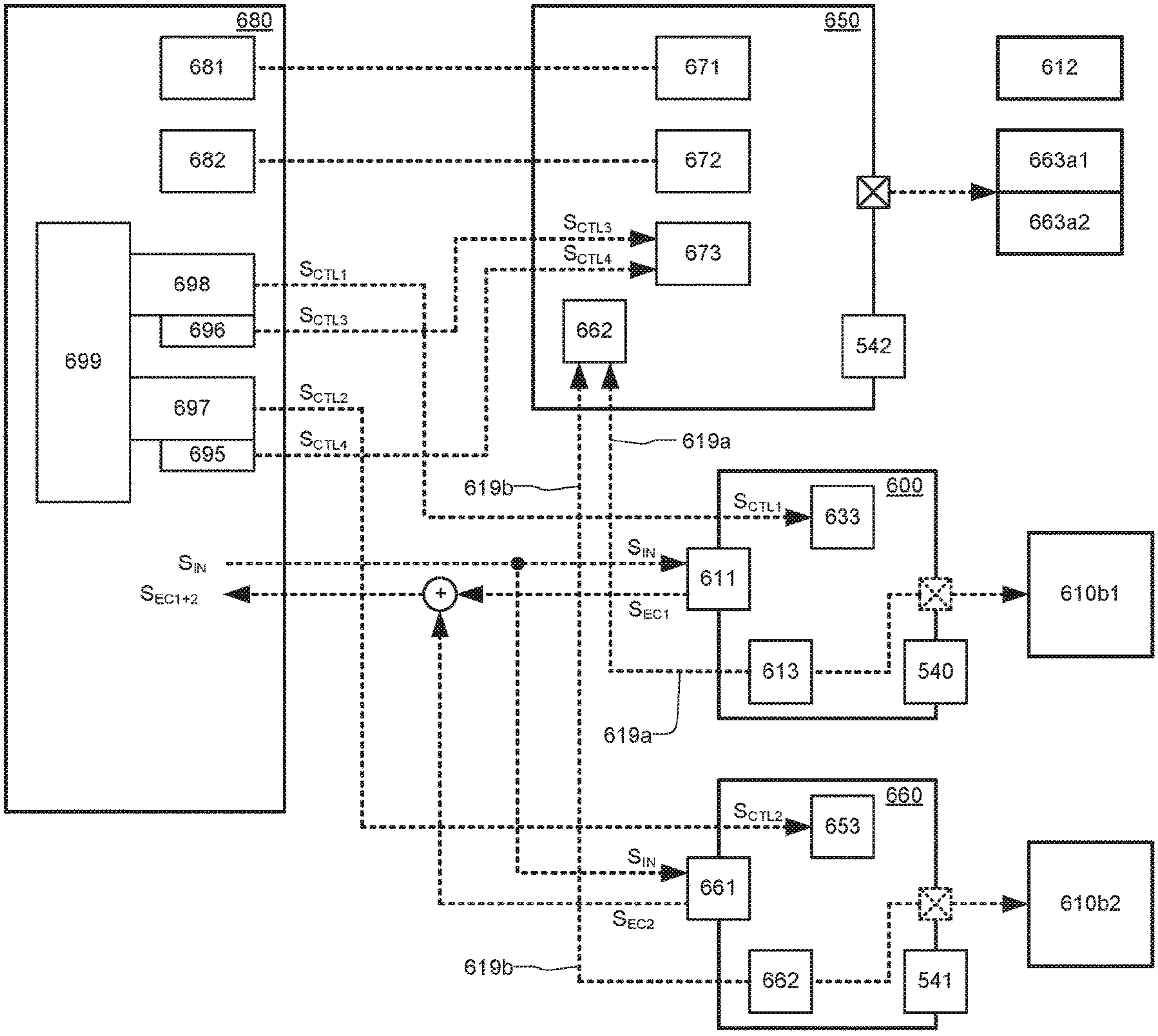

FIG. 5*a* is a simplified schematic diagram of an example arrangement of three integrated circuits, the arrangement being configured to control a four speaker system;

FIG. 5*b* is a simplified schematic diagram of the arrangement of the FIG. 5 example;

FIG. 6 is a simplified schematic diagram of an example arrangement of three integrated circuits, the arrangement being configured to control a four speaker system; and FIGS. 7*a*-7*e* show simplified schematic diagram of some of the example integrated circuits disclosed herein.

DETAILED DESCRIPTION WITH REFERENCE TO THE FIGURES

As used herein the term "driver" will be understood to encompass a hardware driver (e.g. a transducer driver) and/or a software driver (e.g. a device driver). The skilled person will recognise the context from the individual examples as this disclosure relates to hardware and/or software drivers.

Figure 1A:
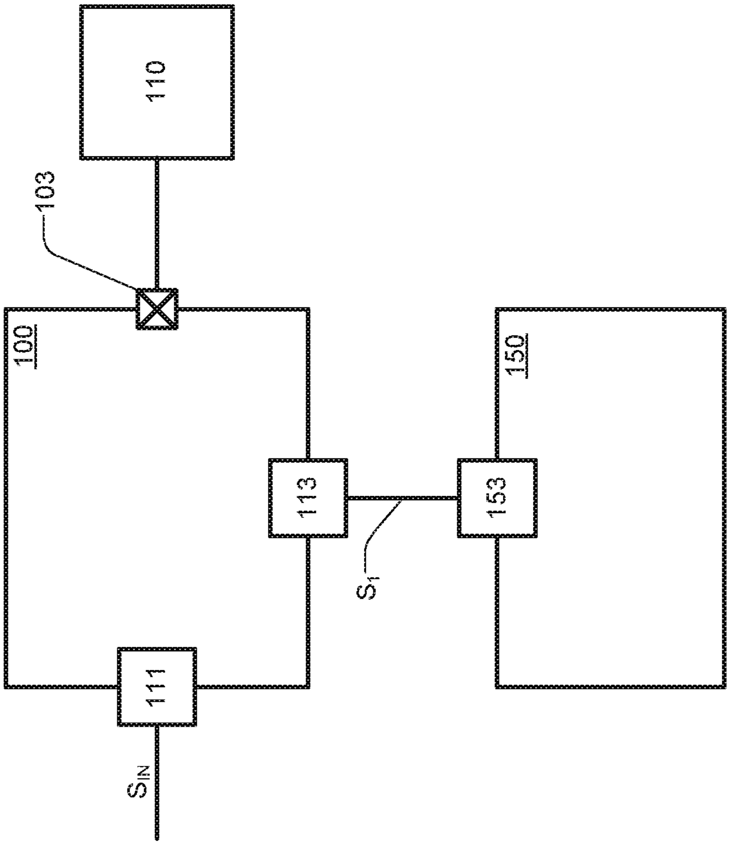

FIG. 1*a* shows a first integrated circuit ("IC") 100 that is configured to: receive, from a host processor (not illustrated), an input signal $S_{IN}$ via an interface or port 111; drive a transducer, 110 via an output node 103; and transmit, via an interface or port 113, a first signal $S_1$ to a second IC 150 via its interface or port 153. The first signal $S_1$ is related to a function of the second IC 150 and, in this way, control over the second IC 150 can be performed by, or via, the first IC 100. In this way, an external (or host) processor (not illustrated) may only "see" the first IC 100, but control of the second IC 150 can be affected via the first IC 100. In this way, the two devices (the first and second ICs 100, 150) are presented as an integrated solution (e.g. as a single integrated device) to a software driver of an operating system.

The first IC 100 may be considered as an interface, buffer, barrier, unhidden, non-masked, and the like, type of IC that is coupled between the host operating processor/system (not illustrated) and the second IC 150, or plurality of second ICs 150-N: where N is an integer of one (1) or more.

Figure 1B:
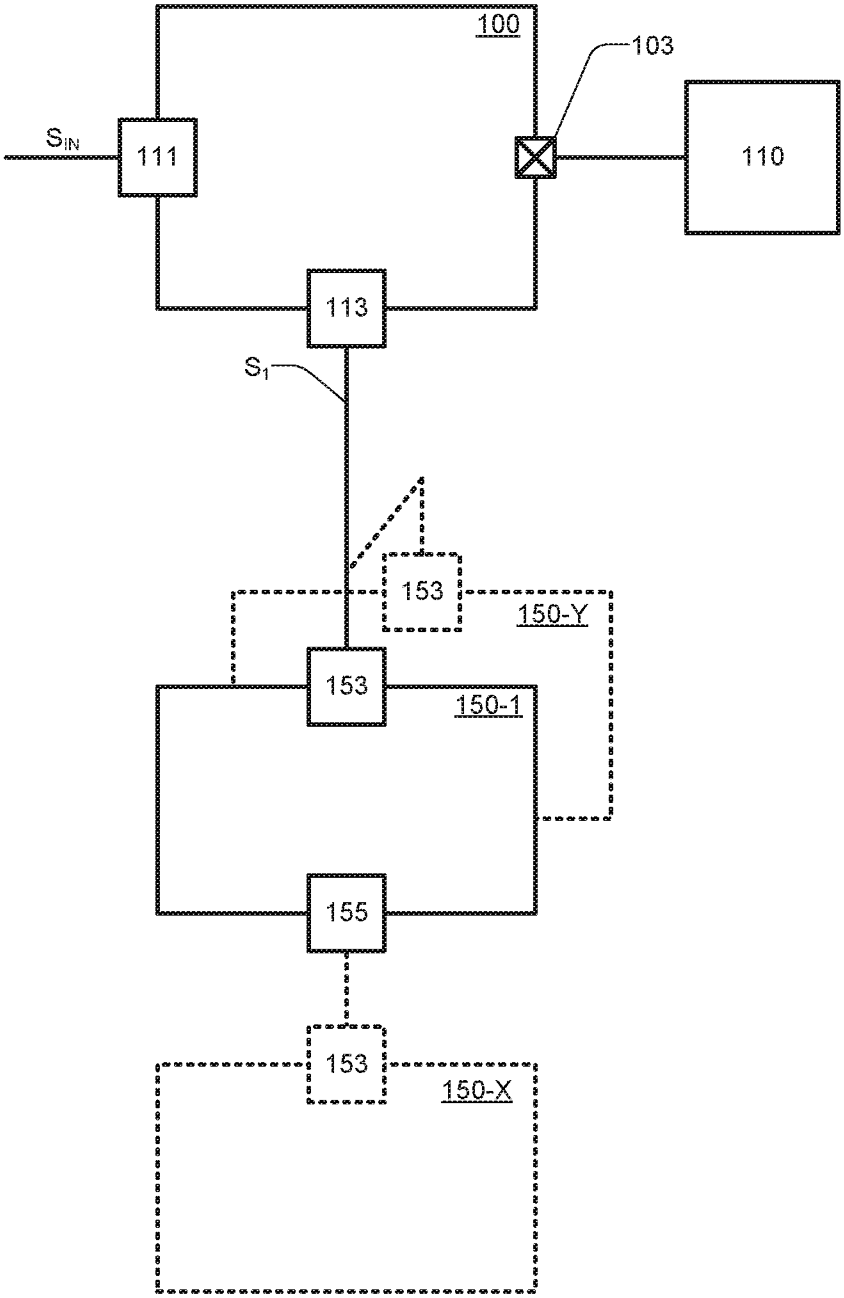

FIG. 1*b* shows such a case, where the second IC 150 comprises a plurality of second ICs 150-N (N being an integer of one (1) or more, as above). The plurality of second ICs 150-N may be series connected (150-X) and/or parallel connected (150-Y) to one another depending on the application as illustrated in FIG. 1*b*: where X+Y=N.

What FIGS. 1*a* and 1*b* show is that because a driver directly controls the first buffer IC 100, it can indirectly (e.g. through or via the first buffer IC 100) control a second buffered IC 150, by extension the driver can control other buffered ICs 150-N as well and, in this way, multiple aggregated transducers may be controlled using this arrangement.

In some examples, as will be described below, the transducer 110 may comprise at least one audio transducer 110. For example, the IC 100 may be configured to drive a single speaker or a plurality of speakers, such as a pair of tweeters or a pair of woofers. As will be described below, the interface IC 100 may be, for example, an audio codec and/or an audio amplifier depending on the application.

Two examples will be discussed in this disclosure. The first example is that the IC 100 may comprise an amplifier. The IC 100 may also comprise a digital signal processor ("DSP") wherein the combination of the amplifier and the DSP may be considered a 'smart amplifier' that is configured to perform an enhancement and/or protection algorithm, for example on an audio signal, and the IC 100 may be configured to drive a transducer 110 on the basis of the processed signal. In this example, the IC 100 may be specifically for the processing of audio and this example IC 100 may be suited for controlling a transducer 110 such as a woofer speaker. In the second example, the IC 100 may comprise a codec. The IC 100 may comprise an analogue-to-digital converter ("ADC") to receive an input analogue signal, e.g. an input audio signal, and a digital-to-analogue converter ("DAC") to transmit an output digital signal (e.g. to drive a speaker) and/or may include an embedded processor, such as an integrated DSP or an integrated microcontroller ("MCU") configured to process control messages and/or enhancement and/or protection algorithms for the IC. The embedded processor may alternatively or additionally provide a simplified control interface to a host (e.g. host processor) and may, for example, translate generic commands into device specific controls. In this example, the interface IC 100 is not only for the purpose of controlling a transducer such as a speaker for example but can also control the programming of the other interfaced or buffered ICs 150-N. In the examples that follow, each type of IC may be used as the first or interface IC 100 in the FIGS. 1*a* and 1*b* arrangements, receiving an audio signal $S_{IN}$ and then transmitting that signal to at least one other second or interfaced IC 150-N.

The buffer IC 100, indeed any of the ICs discussed herein, depending on the example, may comprise an audio device (e.g. a multifunction audio device) such as an audio processor, smart amplifier and/or audio codec. Such audio devices may comprise a MIPI SoundWire® compliant audio device, and as such, the ICs may have a number of associated functions, each of which may be an SDCA function (SDCA meaning "Sound Wire Device Class Audio). According to the SDCA specification, a block of 64 MBytes of register addresses is allocated to SDCA controls. The 26 LSBs which identify individual controls are set based on the following variables:

Function Number

An SCDA device can be split in up to 8 independent Functions. Each of these Functions is described in the SDCA specification, e.g. Smart Amplifier, Smart Microphone, Simple Microphone, Jack codec, HID, etc.

Entity Number

Within each Function, an Entity is an identifiable block. Up to 127 Entities are connected in a pre-defined graph (like USB), with Entity0 reserved for Function-level configurations. In contrast to USB, the SDCA specification predefines Function Types, topologies, and allowed options, i.e. the degree of freedom is not unlimited to limit the possibility of errors in descriptors leading to software quirks.

Control Selector

Within each Entity, the SDCA specification defines up-to 48 controls such as Mute, Gain, Automatic Gain Control (AGC) etc., and 16 implementation defined ones. Some Control Selectors might be used for low-level platform setup, and other exposed to applications and users. Note that the same Control Selector capability, e.g. Latency control, might be located at different offsets in different entities—the Control Selector mapping is Entity-specific.

Control Number

Some Control Selectors allow channel-specific values to be set, with up to 64 channels allowed. This is mostly used for volume control.

Current/Next Values

Some Control Selectors are 'Dual-Ranked'. Software may either update the Current value directly for immediate effect. Alternatively, software may write into the 'Next' values and update the Sound Wire 1.2 'Commit Groups' register to copy 'Next' values into 'Current' ones in a synchronized manner. This is different from bank switching which is typically used to change the bus configuration only.

MBQ

The Multi-Byte Quantity (MBQ) bit is used to provide atomic updates when accessing more than one byte, for example a 16-bit volume control would be updated consistently, the intermediate values mixing old MSB with new LSB are not applied.

The above six (6) described variable parameters are used to build a 32-bit address to access the desired Controls. Because of address range, paging is required, but the most often used parameter values are placed in the lower 16 bits of the address. This helps to keep the paging registers constant while updating Controls for a specific Device/Function.

For example, where a file download request is used, this may be done according to a method defined by the SDCA specification used for downloading firmware and other device-specific files. Each function may be an audio function for example. Each function may comprise a class-specific entity that describes how software running on an external host processor views signal paths internal to the IC 100 to achieve the desired functionality. In one example, the first or buffer IC 100 may be configured to implement the following four SDCA functions: Simple Amplifier, Simple Microphone, Universal Audio Jack (UAJ), and a Network Digital Audio Interface (NDAI). As will be explained below, the barrier IC 100 may comprise an extension unit for each function, being an element contained in one (or more) SDCA audio functions. Accordingly, the firmware/configuration data may be compatible with the SDCA specification.

Figure 2:
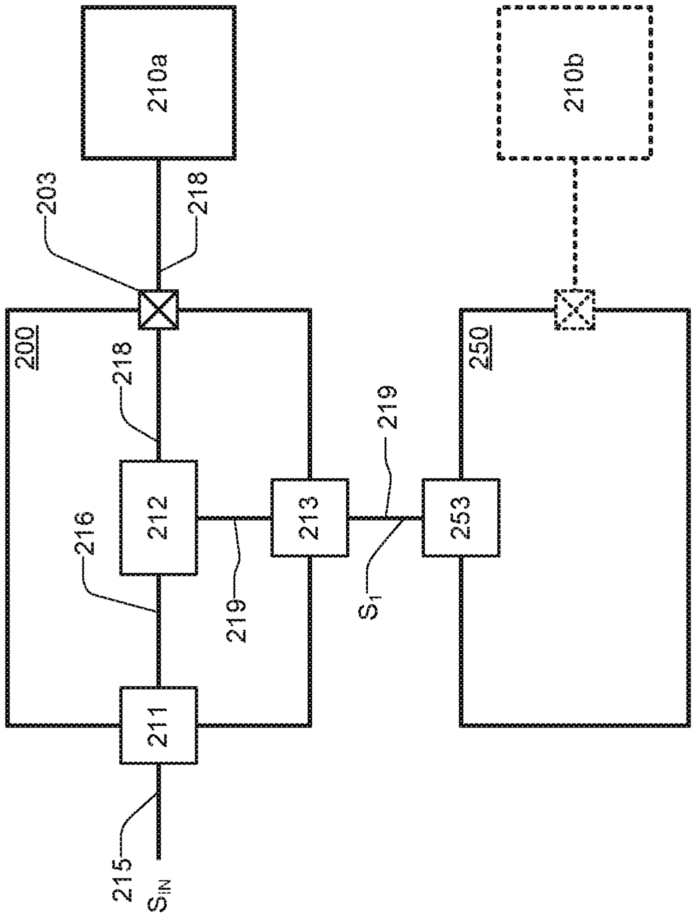
FIG. 2 is a simplified schematic diagram of an example integrated circuit in association with another device.

FIG. 2 shows an integrated circuit ("IC") 200 in more detail. As for the first or buffer IC 100 of FIG. 1, the first or buffer IC 200 is configured to drive a transducer 210*a*, via signal path 218 and output terminal or node 203, and configured to transmit a first signal $S_1$, which is related to a function of the second IC 250, to the second or buffered IC 250 via signal interface or port 213 and signal path 219. The first IC 200 also comprises a signal interface or port 211 which is configured to receive an audio input signal $S_{IN}$ via signal path 215 from a host processor (not illustrated). The buffer or interface IC 200 also comprises a first processor 212 which is configured to receive the audio signal $S_{IN}$, via signal path 216, and configured to drive the transducer 210 based on, or based on at least a portion and/or a representation of, $S_{IN}$. The processor 212 may also be configured to transmit $S_{IN}$, or at least a portion and/or a representation of $S_{IN}$ to the buffered or interfaced IC 250 via signal path 219 and interface or port 253 (e.g. $S_1$ may comprise at least a portion and/or a representation of $S_{IN}$).

The ICs 200 and 250 of FIG. 2 may respectively comprise an amplifier and/or a codec as described above with reference to FIG. 1. In one example, the second IC 250 may itself be configured to drive an audio transducer 210*b* and, in this way, both ICs 200 and 250 may both be configured to control speakers such that, together, they can control a speaker system such as that of a communications device, a computing device or smart device (such as a mobile phone, a laptop or tablet etc.). As regards signal processing, the IC 200 could understand signal routing, consuming a subset of the received signal and redirecting the full signal to the IC 250, or the IC 200 could forward the full signal to the IC 250 which splits the signal, consumes a subset, and re-directs a different subset back to the IC 200. In other words, the IC 200 receives the main audio and may either split that and send part of the signal to the IC 250, or the IC 200 may transmit the full signal to the IC 250 which itself splits the signal. The second IC 250 may comprise a digital signal processor ("DSP"). The DSP 250 may be configured to process the signal received from the first IC 200 and transmit a processed signal back to the first IC 200, the first IC 200 being configured to drive the transducer 210*a* on the basis of the signal that has been processed by the DSP in the second IC 250. Alternatively, the DSP of the second IC 250 could output the DSP output signal, or part thereof, to another IC(s) and/or transducer(s) (e.g. other than back to the first IC 200). The processor 212 in the first IC may comprise an audio signal processor or digital signal processor ("DSP"). The first signal interface 211 may comprise a SoundWire interface to support an incoming audio signal but in examples not concerned with audio it may comprise any suitable signal interface depending on the required application. Audio examples will be described in more detail with reference to the following figures, however it will be appreciated by one skilled in the art that the principles outlined herein may be applicable to non-audio applications, such as video/graphics applications for example.

It will be appreciated that the second or interfaced IC 250 could comprise any suitable combination of hardware and/or software and/or firmware and functionality, but that the architecture shown in FIG. 2, supported by the first IC 200 (and the first IC 100) enables the second IC 250 to be "hidden", "masked", "decoupled" or "isolated" behind the first IC 200 so that the two devices appear as a single integrated device to an operating system.

Figure 3:
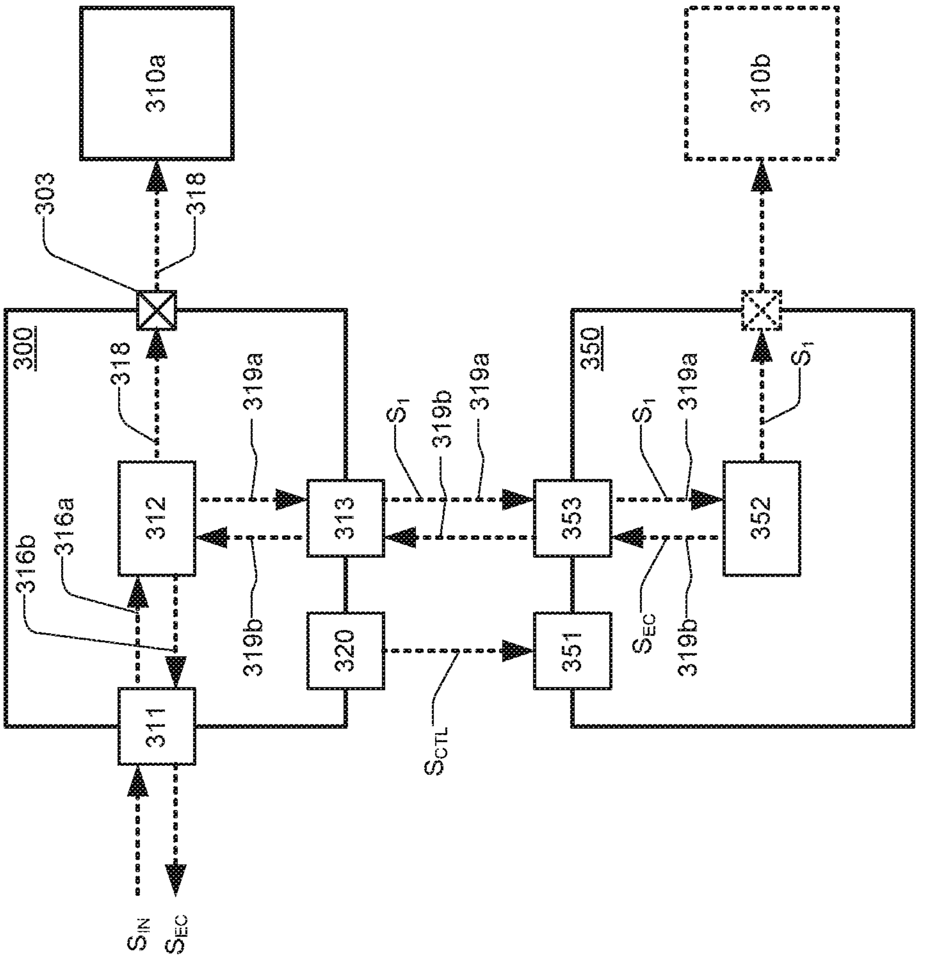
FIG. 3 is a simplified schematic diagram of an example arrangement of integrated circuits.

FIG. 3 shows a first IC 300 configured to drive an audio transducer 310*a* of a speaker of a first type in combination with a second IC 350 configured to drive an audio transducer 310*b* of a speaker of a second type. According to this arrangement, the first or buffer IC 300 is configured to receive an input audio signal $S_{IN}$ from a (not shown) processor. The input signal $S_{IN}$ may be received at a first port or interface 311 of the IC 300 which may comprise a SoundWire™ interface. The signal $S_{IN}$ may comprise a main audio render. The IC 300 is configured to transmit the input signal $S_{IN}$, via signal path 316*a*, to a processor 312, which is configured to: drive the transducer 310*a* via signal path 318 and output node or terminal 303; and transmit a first signal $S_1$ via signal path 319*a* and second interface or port 313 of the buffer IC to a processor 352, via an interface or port 353, of the second buffered IC 350. The first signal $S_1$ may be based on or may be a representation of the input signal $S_{IN}$, whether in part or whole. The second IC 350 is configured to drive a transducer 310*b* on the basis of the received signal $S_1$, or a part/representation thereof, from the buffer IC 300.

The processor 352 of the buffered IC 350 is configured to generate, for example, an echo cancellation signal $S_{EC}$ and transmit that signal to the processor 312 of the first IC 300 via signal path 319*b* and interface/port 353 of the buffered IC 350 and interface/port 313 of the buffer IC 300. The processor 312 of the interface IC 300 is configured to transmit the echo cancellation signal $S_{EC}$ generated by the second IC 350 to the external processor (not illustrated) via signal paths 319*b* and 316*b* and the first interface/port 311 (see 321 and 322). In other words, the first IC 300 is configured to transmit the echo cancellation signal $S_{EC}$ to an external processor via the first interface 311, the signal $S_{EC}$ comprising an echo cancellation signal generated by the second IC 350 (e.g. by the processor 352). The second IC 350 may receive information comprising any audio filter(s) and/or delay parameter(s) of the first IC 300 that are applied to the incoming main render audio signal $S_{IN}$ in order to generate an appropriate echo cancellation signal. The first IC 300 may additionally be configured to process any ultrasonic streams without transmitting any such ultrasonic streams to the second IC 350.

The first IC 300 of this example also comprises a second interface 320, which may comprise a serial peripheral interface ("SPI") (although in other examples the interface may comprise alternate control ports such as $I^2C$). The second interface or port 320 is configured to transmit a control signal $S_{CTL}$ to an interface 351 of the second IC 350. The interface or port 351 of the second IC 350 may also comprise an SPI. The first IC 300 may be configured to transfer firmware to the second IC 350 and/or load firmware into the memory registers (not illustrated) of the second IC 350. For instance, an external processor (not illustrated) may load firmware into the memory registers (not illustrated) of the first IC 300 and also load firmware into the memory registers of the second IC 350 via the interface 320 of the first IC 300 and the interface 351 of the second IC 350. The first buffer IC 300 may be configured to control the second buffered IC 350 in the sense that it can perform firmware signature validation (e.g. configured to validate firmware signatures) for the second IC 350. Firmware for the second IC 350 may be loaded by an extension driver, a trusted host, or via a file download to the first IC 300 which then transfers the firmware to the second IC 350 (via the interfaces 320 and 351). In this way, the second IC 350 is effectively embedded in the first IC 300 such that a driver, or any drivers, for the second IC 350 can exist either entirely on the firmware of the first IC 300 (rather than in a host operating system) or the driver can be a legacy driver running on a host operating system acting via the control interface 320 on the first IC 300

(for example a high definition audio ("HDA") driver may be utilized on the host in examples where the firmware for the first IC 300 is not available).

Each IC 300, 350 of this example is configured to drive a respective transducer 310*a*, 310*b*, which may be transducers associated with speakers of the same type or of a different type. For example, the first IC 300 may be configured to drive a tweeter (310*a*) and the second IC 350 may be configured to drive a woofer (310*b*). The first IC 300 may be configured to drive a pair of tweeters, in one example and/or the second IC 350 may be configured to drive a pair of woofers, in another example.

The first IC 300 in this example may comprise an audio codec and may present itself (and the second buffered IC 350) to a software driver as an amplifier. The processors 312, 352 may each comprise audio signal processors or DSPs and the processor 352 of the second IC 350, may be configured to handle any channel split and/or delay matching. The IC 350 may comprise an amplifier and may comprise a DSP configured to process an enhancement and/or protection algorithm, for example on the audio signal $S_1$ received via signal path 319*a*, the IC 350 driving the transducer 310*b* on the basis of the processed version of the signal $S_1$.

The IC 300 may comprise a codec, e.g. as described with reference to FIG. 1. As such, the IC 300 may comprise any one or more of an ADC to receive the input signal $S_{IN}$ and a DAC to transmit an output signal to drive the speaker 310*a*. The processor 312 may comprise an embedded processor, such as an integrated DSP, or an integrated MCU or the IC 300 may comprise an embedded processor (such as an integrated DSP) or MCU in addition to the audio serial port 313, such a processor/MCU being configured to process control messages and/or enhancement and/or protection algorithms for the IC 300 and/or providing a simplified control interface to a host (e.g. host processor) and may, for example, translate generic commands into device specific controls.

As for the previous example, the FIG. 3 example illustrates an architecture according to which a second IC 350 is "hidden behind" a first IC 300 from the point of view of (a driver of) an external processor running an operating system. This architecture advantageously can be controlled by the simplest driver (e.g. Windows® driver) without the need to "aggregate" the devices in a traditional sense.

Figure 4:
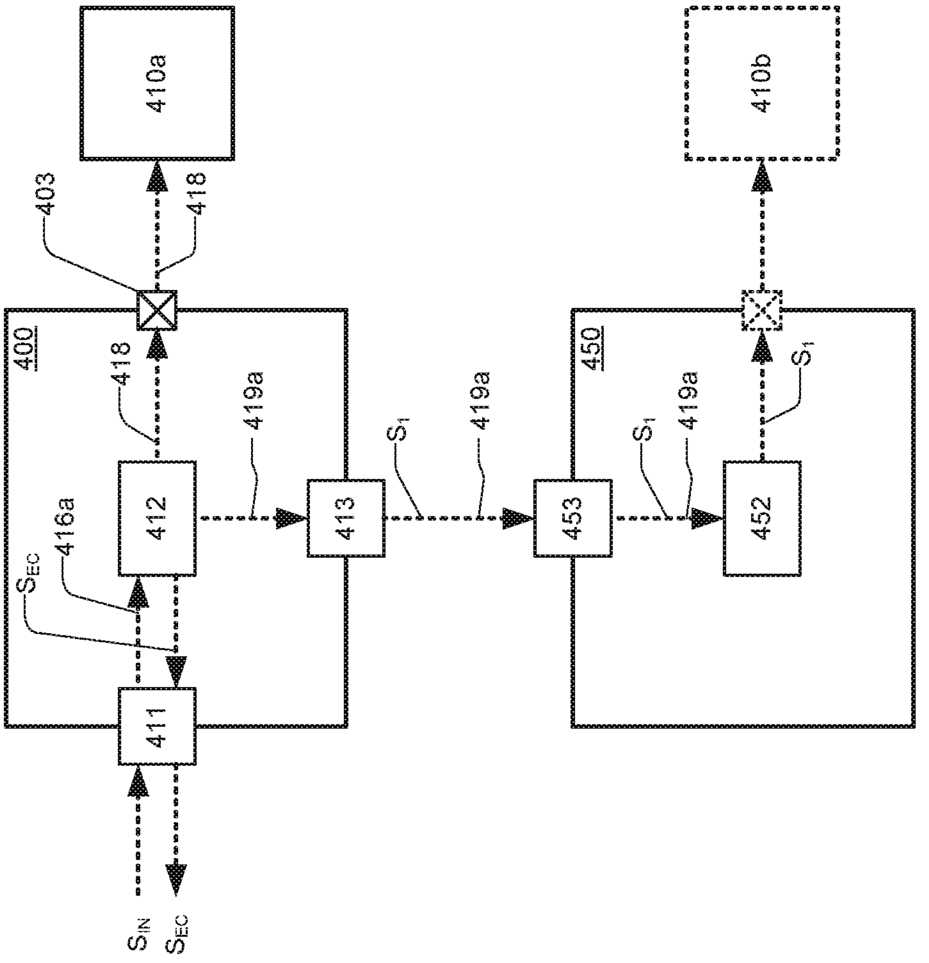
FIG. 4 is a simplified schematic diagram of an example arrangement of integrated circuits.

FIG. 4 shows first and second ICs 400, 450. Like components with respect to the other figures are denoted with like reference numerals and will not be described for brevity. According to this arrangement, an input audio signal (e.g. a main audio render) $S_{IN}$ is received from an external processor (not illustrated) at the first interface or port 411 (which may comprise a SoundWire interface) and transmitted to a processor 412 which drives the transducer 410*a*. The processor 412 also transmits an audio signal $S_1$ that is, or is part/representation of, the input signal $S_{IN}$, to a processor 452 of the second buffered IC 450 via signal path 419*a* and interface/port 413 of the buffer IC 400 and interface/port 453 of the buffered IC 450. In this arrangement, the processor 412 of the first IC 400 generates an echo cancellation signal $S_{EC}$ and ultimately transmits this to the external processor (not illustrated) via the first interface or port 411. To generate the echo cancellation signal $S_{EC}$, the first IC 400 may receive information containing any filter(s) and/or delay parameters(s) of the signal. The first IC 400 in this example may be configured to receive, process, and transmit ultrasonic streams.

The arrangement shown in FIG. 4 is slightly different to that of FIG. 3 in that the first buffer IC 400 does not comprise a control interface (denoted by 320 in FIG. 3), meaning that the IC 400 does not comprise an interface permitting host control (control by a host processor). This means that writes to the second buffered IC 450 may be handled directly by the host (as opposed to in FIG. 3 where they were handled indirectly by the host, via the first IC 300). In turn, this means, that a different type of IC can be used as the first IC 400 in the FIG. 4 arrangement as opposed to the FIG. 3 arrangement. For example, in the FIG. 3 arrangement, the first IC 300 may comprise an audio codec, having the control interface 320, since the buffer IC 300 is afforded some control over the buffered IC 350. The second IC 350 may comprise an audio integrated circuit, and may have a greater ability to process an audio signal than the codec 300 (e.g. comprising one or more of a DSP, an amplifier modulator, tone controls etc.). This is why the FIG. 3 arrangement may be suited for a first IC 300 controlling a tweeter (or tweeter pair) and the second IC 350 controlling a woofer. In contrast, the first IC 400 of the FIG. 4 arrangement has no such control over the second IC 450. The first IC 400 may comprise an audio integrated circuit, and may have a greater ability to process an audio signal than an codec (e.g. comprising one or more of a DSP, an amplifier modulator, tone controls etc.). The second IC 450 may comprises an audio codec. In the FIG. 4 arrangement therefore, the first IC 400 may be configured to drive a woofer and the second IC 450 may be configured to drive at least one tweeter (such as a tweeter pair).

As for the previous examples, the FIG. 4 example illustrates an architecture according to which a second IC 450 is "hidden behind" a first IC 400 from the point of view of (a driver of) an external processor running an operating system.

Each IC 400, 450 could optionally comprise a general purpose input/output interface or port ("GPIO") in examples where it is desired for extension drivers to only handle initialisation of the IC 400 and/or the IC 450, without being afforded control of the runtime configuration of the ICs 400, 450. In examples without such a GPIO, an extension driver/driver(s) may handle runtime functions (for example, stream start and stream stop).

FIG. 5 is an example of the disclosure that builds on the architecture shown in FIG. 3. This example implements a four-speaker system with two types of integrated circuit (IC). As will be explained below, according to this arrangement, two audio transducers (of tweeters 510*a*1, 510*a*2) are driven by an audio codec (the first or buffer IC 500) and a further two audio transducers (of woofers 510*b*1, 510*b*2) are driven by respective audio integrated circuits (the second and third or buffered ICs 550, 560).

According to FIG. 5, a host processor 580 comprises one or more drivers 581-583. In this example, 581 is a driver of a microphone, 582 is a driver of a jack (such as a universal audio jack or "UAJ") 512, and driver 583 is a driver of a transducer. The driver 583 of this example may be configured to drive all four speakers/transducers of the system as will be now explained.

A first integrated circuit 500 is an audio codec in this example and is configured to drive two tweeter speakers 510*a*1 and 510*a*2. The first IC 500 may be considered as an IC of a first type. The buffer IC 500 comprises a first interface or port 511 which is an audio interface such as SoundWire™ and is configured to receive a main render audio signal $S_{IN}$, which is configured to be transmitted to a processor 512 and the processor 512 is configured to drive the pair of tweeter speakers 510*a*1 and 510*a*2.

The system of FIG. 5 comprises buffered IC's 550 and 560, each configured to drive (or control) a woofer speaker/ transducer 510$b$1 and 510$b$2. The second IC 550 and third IC 560 may be ICs of a second type (different to the first type). Therefore, the second and third ICs 550, 560 may be ICs of the same type.

The processor 512 of the first IC 500 is configured to transmit the audio signal $S_{IN}$, or part/representation thereof, to each of the second and third ICs 550, 560 (see paths labelled 519$a$).

The IC 500 comprises a control interface 520, which may comprise a serial peripheral interface or port ("SPI") which can communicate with respective interfaces or ports (e.g. SPIs) 551, 561 of the second and third ICs 550, 560. Via these interfaces 520, 551 and 561, the first IC 500 (or the host processor 580, through the first IC 500) can perform tasks such as configuring the second and third ICs 550, 560 (e.g. loading firmware into the memory spaces or registers of the ICs) as described above with respect to FIG. 3.

The processor 512 of the first IC 500 is configured to transmit the main audio signal $S_{IN}$ to respective processors 552, 562 of the second and third ICs 550, 560 via signal paths 516$a$ and 519$a$. The second and third ICs 550, 560 (e.g. the processors 552, 562 thereof) are configured to perform at least one of: separating the audio signal $S_{IN}$ into appropriate channels for their respective speakers (e.g. separating into appropriate frequency components) and delay matching. As indicated by signal path 516$b$ and 519$b$ each of the second and third ICs 550, 560 (e.g. the processors 552, 562 thereof) are configured to transmit echo cancellation signals $S_{EC1}$, $S_{EC2}$ (e.g. left and right channels) back to the processor 512 of the first IC which transmits a stereo echo cancellation signal $S_{EC1+2}$ back to the processor 580.

In summary, the first IC 500 in this example presents as a 2×2 smart amp to the processor 580 (e.g. to the driver 583). The main audio render $S_{IN}$ according to this architecture is routed to each of the second and third ICs 550, 560, from a processor 512 of the buffer IC 500 to the processors 552, 562 of the buffered ICs 550, 560. Each of the second and third ICs 550, 560 then handle the channel split and delay matching, and return echo cancellation signals $S_{EC1}$, $S_{EC2}$ (e.g. left and right channels) back to the first IC 500 via their processors. This architecture advantageously can be controlled by even a simple driver, without the need for aggregation. The first IC 500 could be configured to perform firmware signature validation (e.g. configured to validate firmware signatures) for one or more of the second and third ICs (through the interfaces 520, 551).

As stated above, the second and third ICs 550 and 560 handle the echo cancellation signals $S_{EC1}$, $S_{EC2}$ (e.g. assuming main render is in sync and that the filter and delay parameters of the first IC 500 are knowable). The first IC 500 may be configured to process ultrasonic streams entirely within the first IC 500. Firmware for the second and/or third ICs 550, 560 may be loaded by an extension driver, via a trusted host (secure systems), or via a file download to the first IC 500 which then transfers the firmware to the second and/or the third IC 550, 560. The first IC 500 may be configured to extract tweeter content from reference signals using on-board filters, and in this way eliminate a channel (e.g. an Rx channel).

It will be appreciated that additional ICs of the second type (e.g. additional ICs like 550 and 560 etc.) may be added to the system of FIG. 5 and controlled by the processor 580.

By virtue of this arrangement, an embedded integration for a buffered IC of a second type (such as 550, 560) is achieved, allowing their drivers to exist either entirely on the firmware of the first IC 550 rather than in the host OS (e.g. running on the processor 580), or the driver may be a driver running on the host OS acting via the control interface 520 on the first IC (for example the second and/or third driver, such as a high definition audio driver, may be utilized on the host if the firmware for the first IC 500 is not available).

In operation, a stereo audio stream $S_{IN}$ is transmitted to the first IC 500. The processor 512 of the first IC 500 is configured to separate the audio stream into two sets of frequency components (e.g. band splitting the audio into high/low frequency components). In this example, the low frequency components are transmitted to the second and third ICs 550, 560 for them to drive the woofers 510$b$1/2 and the first IC 500 drives the tweeters 510$a$1/2 using the high frequency components. Any control information (such as volume and/or sample rate etc.) that is transmitted from the processor 580 is intercepted by the first IC 500 and sent over the control interface (SPI) 520 to the second and/or third ICs 550, 560 via their respective interfaces or ports 551, 561. These messages may be deconstructed as necessary. Due to this configuration, the arrangement presents itself as a single stereo amplifier to an operating system despite the fact that it is a four-speaker system. This, in turn, means that the driver need only access the controls for a single device/stereo amplifier.

In an example, the interface 511 comprises one SoundWire port input, for the two channel main render audio signal $S_{IN}$, and one SoundWire port output for a two-channel echo cancellation signal. The first IC 500 could additionally comprise an ultrasonic render. The IC 500 (e.g. the processor 512 and/or interface 513 thereof) comprises two transmission (Tx) channels for transmitting the main audio render $S_{IN}$ to the second and third ICs 550, 560, and two receive (Rx) channels for receiving the echo cancellation signals $S_{EC1}$ and $S_{EC2}$ from the second and third ICs 550, 560. The processor 512 and/or interface 513 could comprise two additional Rx channels for tweeter content. The processors 552, 562 and/or interfaces 553, 563 of the second and third ICs 550, 560 comprise two Rx channels to receive the main audio render $S_{IN}$ from the first IC 500 as a common stream, and one Tx channel each to transmit the echo cancellation signal (but they could comprise an additional Tx channel, for example to transmit tweeter content).

FIG. 5$a$ shows the FIG. 5 example more schematically for ease of illustration. FIG. 5$a$ shows how the FIG. 5 arrangement provides for the automatic echo cancellation from 4 speakers, thereby simplifying the AEC algorithm implementation. This figure also shows, on a more simplified and schematic basis, how the signal paths are routed. As described above with reference to FIG. 2, the tweeter audio paths could be provided by the DSP of the second and third ICs. The first IC could process (or consume) a subset of the received main render audio signal and pass the remaining subset to the second and third ICs or the second and third ICs could receive the main render audio signal and consume a subset of that (to drive their respective woofers). Note that although in FIG. 5$a$ the input is indicated as being a Soundwire™ (SdW) input, it will be appreciated that other interfaces could be used depending on the example.

FIG. 6 is an example of the disclosure that builds on the architecture shown in FIG. 4. This system again supports a 4-speaker system and comprises two types of integrated circuits. This configuration is different to the FIG. 5 configuration as follows.

A first IC 600 is configured to drive a woofer speaker 610$b$1 and is an IC of a first type. A second IC 650 is an audio codec configured to drive a pair of tweeter speakers 663$a$1, 663$a$2 and is an IC of a second type. A third IC 660 is also configured to drive a woofer speaker 610$b$2 and is an IC of the first type. A main audio render signal $S_{IN}$ is transmitted (e.g. from a processor 680) to both the first and third ICs 600, 660 which each comprise respective interfaces 611, 661 (which may each be SoundWire™ interfaces). Each of the first and third ICs 600, 660 are configured to generate respective echo cancellation signals and transmit their respective echo cancellation signals $S_{EC1}$ and $S_{EC2}$ back to the host processor 680 (these may respectively comprise left and right channels of an echo cancellation signal). Each of the first and third ICs 600, 660 comprise control modules 633, 653 for driving respective amplifier transducers 610*b*1 and 610*b*2, wherein the control modules 633 and 653 are respectively controlled by drivers 698 and 697 of the operating system (see $S_{CTL1}$ and $S_{CTL2}$).

In the FIG. 5 example the IC driving the tweeter pair received the main render audio signal $S_{IN}$ and transmitted this to two ICs respectively driving woofers 510*b*1 and 510*b*2. In the FIG. 6 example, each of the first and third ICs 600, 650 (the ICs respectively driving woofers 610*b*1 and 610*b*2) receives the main render audio signal $S_{IN}$ and transmits the main render audio signal (see the paths labelled 619*a,b*), via their processors 613 and 662, to a processor 662 of the second IC 660, which drives the tweeter pair.

The second IC 650 comprises control module 673 for driving the tweeter pair 663 that are controlled by extension drivers 695, 696 of the processor 680 (see $S_{CTL3}$ and $S_{CTL4}$). As for FIG. 5, the processor 680 comprises one or more drivers 681-682. In this example, also as for FIG. 5, 681 is a driver of microphone and 682 is a driver of a jack (such as a universal audio jack or "UAJ").

Each IC 600, 650, 660 also respectively comprises a general purpose input/output (GPIO) 540, 541, 542.

According to this example, the first and third ICs 600, 660 receive the main audio render $S_{IN}$ and each return an echo reference signal $S_{EC1}$, $S_{EC2}$, via their respective interfaces 611, 661 (e.g. Soundwire® interfaces) and pass processed audio (e.g. tweeter audio) to the second IC 650 via their processors 613, 662 (e.g. the paths labelled 619). In other words, the processors 613 and 662 are configured to generate processed audio (e.g. tweeter audio) from the received main audio render $S_{IN}$. The first and third ICs 600, 660 lack a host control interface, so the writes to the second IC 660 may be handled by the host processor 680. The first and third ICs 600, 660 handle the echo cancelation signals, assuming that the main audio render $S_{IN}$ is in sync and that the filter and delay parameters of the second IC 660 are knowable. The first and third ICs 600, 660 may be configured to pass through ultrasonic streams. A GPIO from one or more of the first and third ICs to the second IC may enable/disable a signal from the first or third ICs to the second IC (meaning that an extension driver/extension driver(s) may only need to handle initialization, and not runtime configuration). Without the GPIO, the extension driver(s) may handle stream start and stream stop.

In an example, the processor 662 of the second IC 650 (and/or an interface thereof) comprises two Rx channels to receive audio (e.g. tweeter audio). The first and third ICs 600, 660 may each comprise one SoundWire® port two-channel input to receive the main render audio $S_{IN}$ as a common stream, and one SoundWire® port output, one channel, for the echo cancellation signal. The processors 613, 662 of the first and third ICs 600, 660 (and/or an interface thereof) comprise one Tx channel to transmit tweeter content to the second IC 650. The first and third ICs 600, 660 could comprise a SoundWire® port output for a single channel ultrasonic render.

Comparing the FIGS. 5 and 6 examples, the FIG. 5 architecture may be utilised when the driver capabilities on the host side are unspecified or unclear, as this architecture is the least dependent on the capabilities of the driver; FIG. 6 showing more work being done on the driver side (whereas FIG. 5 does that work in the IC 500). Of course, the utilisation of the FIG. 5 or 6 architectures will depend on the example etc.

It will be appreciated that a schematic diagram of the type of FIG. 5*a* could be readily provided for the FIG. 6 arrangement also. As described above, the tweeter audio paths could be provided by the DSP of the second and third ICs. The ICs 600, 660 could process (or consume) a subset of the received main render audio signal and pass the remaining subset to the IC 650, or the IC 650 could receive the main render audio signal and consume a subset of that (to drive its tweeters).

Various arrangements are therefore discussed herein where one device may be "hidden behind" another, such that the two devices are connected in such a way that they present themselves as a single device to a processor whose drive is afforded control over the devices.

As discussed above, a first IC may receive an audio signal and transmit this to a second device, which may comprise an IC or another type of device such as a DSP, the second device processing or transmitting the signal in some way. This has the ability of offloading the functionality of the second device which can be controlled by the firmware of the first IC. In more detail, one of the reasons problems can occur with aggregated transducers driving multiple and different speaker types is due to the software driver on the processor being unable to read the device features for different devices, and knowing how to combine those such that the processor can control all of the devices. According to the techniques discussed here, multiple devices are effectively combined into one endpoint (the first IC) which is seen by the processor so the driver reads the features appropriate for the first IC, and can control other (aggregated) devices due to how the subsequent devices are connected to the first IC (as discussed with reference to FIGS. 3-6).

With reference again to FIG. 1, the second device 150 could be an IC other than an audio IC for driving a transducer in some examples. The second device 150 could be a device configured to process the audio in some way and either transmit this back to the first IC 100 or output a processed signal (e.g. to drive another component). Any number of algorithms could therefore be run on the second device 150 to process the audio. The second device could therefore be a DSP codec. The first IC (e.g. an SDCA codec) could be combined with a DSP codec to create a smart codec split between two devices. The first IC (e.g. an SDCA codec) could be combined with a headphone codec to provide a higher performance headphone path. The first IC (e.g. an SDCA codec) could be combined with a simple codec to create an additional output path such as for a jack or an analogue to digital converter etc. as required by the example. It will readily be appreciated how the teachings disclosed herein could be expanded to a wide range of audio solutions.

Any one or more of the ICs described herein may be configured to perform band split filtering (as described above), may comprise a delay line (e.g. for the time-alignment of audio), configured to perform enhanced processing of audio, and/or may be configured to perform level matching.

Figure 7A:
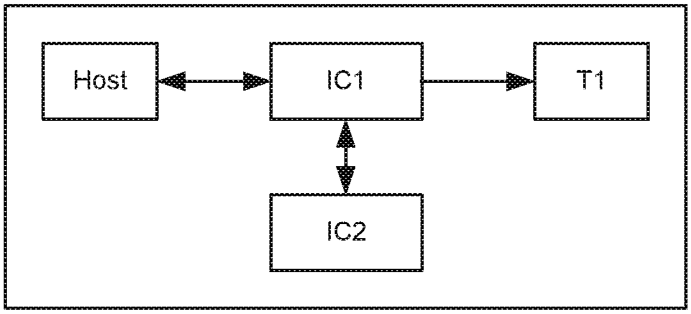
Figure 7B:
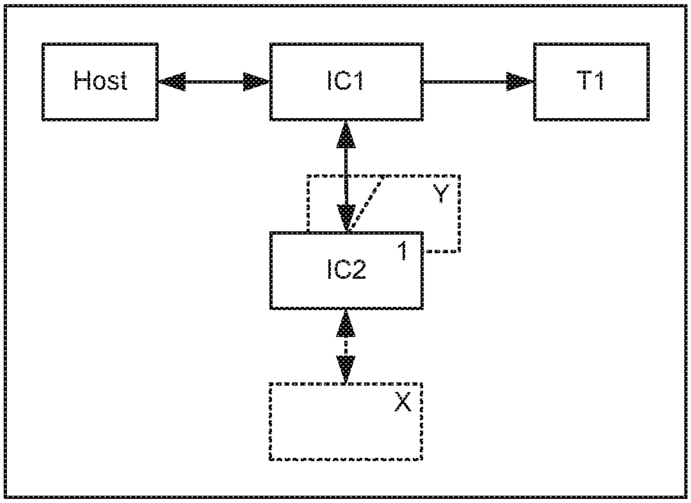
Figure 7C:
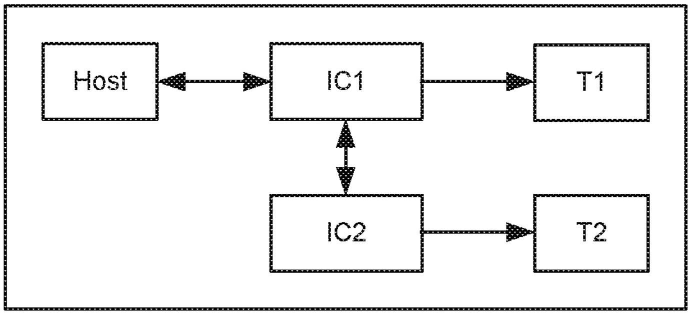
Figure 7D:
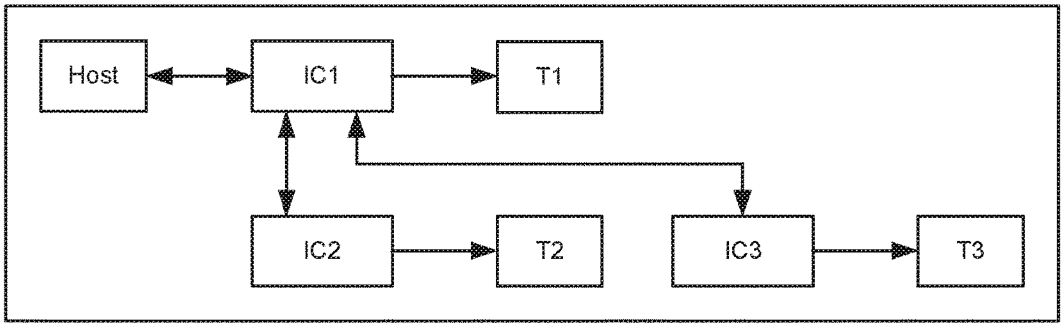
Figure 7E:
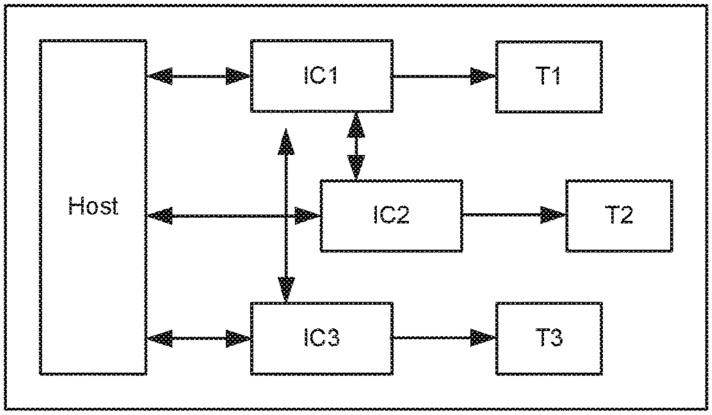

FIGS. 7*a*-*e* schematically show high-level diagrams of the example ICs disclosed herein. FIG. 7*a* schematically shows an IC as described with reference to FIG. 1*b* driving a transducer T1 and in association with a second IC2. FIG. 7*b* schematically shows an arrangement of ICs as described with reference to FIG. 1*b*. FIG. 7*c* schematically shows two ICs IC1 and IC2, respectively driving transducers T1 and T2, as described with reference to FIGS. 2-4. Similarly, FIGS. 7*d* and 7*e* schematically show IC arrangements as described with reference to FIGS. 5 and 6, respectively.

The examples described herein overcome the following challenges. The posture of the end-device having the aggregated transducers is supported, particularly when different ICs exhibit different performance characteristics. The signal processing capabilities of any given IC can be concerned with a specific function (e.g. filtering, e.g. audio filtering—a given IC may be to produce a tweeter output from a full-range stream, for example). A given IC may only support a given bandwidth render, and there may be sample rate changes on an amplifier path. A given IC may have a different group delay compared to another IC (e.g. due to DSP etc.). For one example IC, the main render delay may be minimum 32 samples, plus any delay introduced by a signal chain(s). A given IC may have a Serial Peripheral Interface (SPI) master, whereas another given interface IC may have a SPI drive interface and two I2C driven interfaces.

According to this disclosure there is therefore provided an architecture (e.g. an SDCA architecture) enabling a disintegrated audio implementation to appear as an integrated solution to an operating system. The architecture provides: (i) capability to transfer audio data between a device (such as an SDCA device) a secondary device (in some examples via an 12S interface); (ii) capability to transfer control data between a device (such as an SDCA device) and a secondary device (e.g. via an SPI); (iii) re-programmable SDCA implementation enabling the SDCA device to be configured as needed for the overall architecture (e.g., an ARM M0+ processor); (iv) delayed register read/write for an SDCA device (giving time to communicate with the second device and respond if required). An operating system can therefore aggregate multiple speaker devices into a single speaker endpoint where the solution "looks like" (to an external processor) a stereo pair of amplifiers. This architecture handles the signal splitting and sending to the appropriate amplifiers.

Features of any given aspect or example may be combined with the features of any other aspect or example and the various features described herein may be implemented in any combination in a given example.

The term "node" as used herein shall be understood by those of ordinary skill in the art to include the mechanical and/or electrical connection terms "terminal", "bond pad", "pin", "ball" etc.

The skilled person will recognise that where applicable the above-described apparatus and methods may be embodied as processor control code, for example on a carrier medium such as a disk, CD- or DVD-ROM, programmed memory such as read only memory (Firmware), or on a data carrier such as an optical or electrical signal carrier. For many applications, embodiments of the invention will be implemented on a DSP (Digital Signal Processor), ASIC (Application Specific Integrated Circuit) or FPGA (Field Programmable Gate Array). Thus, the code may comprise conventional program code or microcode or, for example code for setting up or controlling an ASIC or FPGA. The code may also comprise code for dynamically configuring re-configurable apparatus such as re-programmable logic gate arrays. Similarly, the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re-)programmable analogue array or similar device in order to configure analogue hardware.

It should be noted that the above-mentioned examples illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words “means for” or “step for” are explicitly used in the particular claim.

The invention claimed is:

1. A first integrated circuit configured to receive an audio signal from an external processor and configured to drive an audio transducer based on the received audio signal, the first integrated circuit being configured to transmit a portion of the audio signal to a second integrated circuit and configured to receive an echo cancellation signal from the second integrated circuit and to transmit the received echo cancellation signal to the external processor.

2. The first integrated circuit of claim 1, further comprising a first interface and a processor of the first integrated circuit, wherein the first interface is configured to receive the audio signal and transmit the audio signal to the processor of the first integrated circuit, wherein the processor of the first integrated circuit is configured to transmit the portion of the audio signal to the second integrated circuit.

3. The first integrated circuit of claim 2, wherein the processor of the first integrated circuit is further configured to generate an echo cancellation signal.

4. The first integrated circuit of claim 2, wherein the processor of the first integrated circuit is configured to split the received audio signal into first and second frequency bands, wherein the first integrated circuit is configured to drive the audio transducer on the basis of one of the first and second frequency bands, and wherein the processor of the first integrated circuit is configured to transmit the other of the first and second frequency bands to the second integrated circuit.

5. The first integrated circuit of claim 1, wherein the processor of the first integrated circuit is configured to receive two mono echo cancellation signals and combine these into a stereo echo cancellation signal, and wherein the first interface is configured to transmit the stereo echo cancellation signal to the external processor.

6. The first integrated circuit of claim 1, wherein the first integrated circuit is configured to drive at least one tweeter speaker and/or at least one woofer speaker.

7. The first integrated circuit of claim 1, further comprising a second interface, wherein the first integrated circuit is configured to transmit a control signal, via the second interface, to the second integrated circuit to control a function of the second integrated circuit.

8. The first integrated circuit of claim 7, wherein the first integrated circuit is configured to receive the control signal from the external processor.

9. The first integrated circuit of claim 7, wherein the first integrated circuit is configured to load and/or manage and/or validate firmware on the second integrated circuit via second interface.

10. The first integrated circuit of claim 7, wherein the first integrated circuit is configured such that the external processor can load and/or manage and/or validate firmware on the second integrated circuit via the second interface of the first integrated circuit.

11. The first integrated circuit of claim 1, the first integrated circuit being additionally configured to control an audio jack and/or a microphone.

12. The first integrated circuit of claim 1, further comprising any one or more of:

a digital signal processor configured to process the received audio signal;

an analogue to digital converter configured to receive an input analogue signal and convert it to a digital signal;

a digital to analogue converter configured to convert a digital signal into an analogue signal to be output to the audio transducer; and a microcontroller to process a control message and/or an enhancement and/or a protection algorithm for the first integrated circuit and/or the second integrated circuit.

13. A system comprising the first integrated circuit of claim 1, further comprising the external processor, wherein the external processor stores a programmable table that is readable by software, wherein the table comprises an entry that, when read by an operating system, presents at least the first and second integrated circuits as an integrated device to the operating system.

14. The system of claim 13, wherein at least the first integrated circuit and the second integrated circuit appear as an integrated solution to a processor running an operating system.

15. The first integrated circuit of claim 1, wherein at least the first integrated circuit and the second integrated circuit appear as an integrated solution to a processor running an operating system.

16. A device comprising:

a first integrated circuit comprising a first interface to receive an audio signal, and a processor of the first integrated circuit configured to drive a first audio transducer on the basis of the received audio signal; and a second integrated circuit comprising a processor of the second integrated circuit configured to receive an audio signal and configured to drive a second audio transducer on the basis of the received audio signal;

wherein the processor of the first integrated circuit is configured to transmit a portion of the received audio signal to the processor of the second integrated circuit; and wherein the second integrated circuit is configured to transmit an echo cancellation signal to the first integrated circuit, and wherein the first integrated circuit is configured to receive the echo cancellation signal from the second integrated circuit and to transmit the received echo cancellation signal to the external processor.

17. The device of claim 16 wherein one of the first and second integrated circuits is configured to drive at least one tweeter speaker and wherein the other of the first and second integrated circuits is configured to drive at least one woofer speaker.

18. The device of claim 16, wherein the processor of the first integrated circuit is configured to separate the received audio signal into a first component having a first frequency and a second component having a second frequency, wherein the first integrated circuit is configured to drive the first audio transducer on the basis of the first frequency signal component, and wherein the processor of the first integrated circuit is configured to transmit the second frequency component to the processor of the second integrated circuit, wherein the processor of the second integrated circuit is configured to drive the second audio transducer on the basis of the second frequency signal component.

19. The device of claim 16, wherein the first integrated circuit comprises a control interface, and wherein the second integrated circuit comprises a control interface, wherein:

the first integrated circuit is configured to receive a control signal from the external processor; and/or the first integrated circuit is configured to load and/or manage and/or validate firmware on the second integrated circuit via the control interfaces; and/or the first integrated circuit is configured such that the external processor can load and/or manage and/or validate firmware on the second integrated circuit via the control interface of the first integrated circuit.

20. The device of claim 16 comprising a third integrated circuit comprising a processor of the third integrated circuit configured to receive the audio signal from the first integrated circuit and configured to drive a third audio transducer on the basis of the signal received from the processor of the first integrated circuit.

21. The device of claim 20 wherein the first integrated circuit is configured to drive a pair of tweeters, and wherein each of the second and third integrated circuits is configured to drive a woofer.

22. The device of claim 20, wherein the processor of the second integrated circuit is configured to transmit a mono echo cancellation signal to the processor of the first integrated circuit, wherein the processor of the third integrated circuit is configured to transmit a mono echo cancellation signal to the processor of the first integrated circuit, wherein the processor of the first integrated circuit is configured to receive the two mono signals from the second and third integrated circuits, combine the received mono signals into a stereo echo cancellation signal, and wherein the first integrated circuit is configured to transmit the stereo echo cancellation signal to an external processor.

23. The device of claim 20, wherein the first integrated circuit comprises a control interface, and wherein the second and third integrated circuits respectively comprise a control interfaces, wherein:

the first integrated circuit is configured to receive a control signal from the external processor; and/or the first integrated circuit is configured to load and/or manage and/or validate firmware on the second and/or third integrated circuits via their control interfaces; and/or the first integrated circuit is configured such that the external processor can load and/or manage and/or validate firmware on the second and/or third integrated circuits via the control interface of the first integrated circuit.

24. The device of claim 20, wherein any one or more of the first, second, or third integrated circuits comprises an audio codec and/or a digital signal processor.

25. The device of claim 16, wherein the processor of the first integrated circuit is configured to generate and transmit an echo cancellation signal to an external processor.

26. The device of claim 16, comprising a third integrated circuit comprising a processor of the third integrated circuit configured to receive an audio signal and configured to drive a third audio transducer on the basis of the signal received from the processor of the first integrated circuit.

27. The device of claim 26 wherein each of the first and third integrated circuits is configured to drive a woofer, and wherein second integrated circuit is configured to drive a pair of tweeters.

28. A system comprising the device of claim 16, further comprising the external processor, wherein the external processor stores a programmable table that is readable by software, wherein the table comprises an entry that, when read by an operating system, presents at least the first and second integrated circuits as an integrated device to the operating system.

29. The device of claim 16, wherein at least the first integrated circuit and the second integrated circuit appear as an integrated solution to a processor running an operating system.

* * * * *